AUTOMATIC BRAKE ADJUSTING MECHANISMS

Original Filed Dec. 14, 1959 2 Sheets-Sheet 1

INVENTOR.
GIANNI A. DOTTO
BY
Marechal, Biebel, French & Bugg
ATTORNEYS

AUTOMATIC BRAKE ADJUSTING MECHANISMS

Original Filed Dec. 14, 1959 2 Sheets-Sheet 2

INVENTOR.
GIANNI A. DOTTO
BY
Marechal, Biebel, French & Bugg
ATTORNEYS

United States Patent Office

Re. 26,106
Reissued Nov. 1, 1966

26,106

AUTOMATIC BRAKE ADJUSTING MECHANISMS

Gianni A. Dotto, Dayton, Ohio, assignor to The Dayton Steel Foundry Company, Dayton, Ohio, a corporation of Ohio Original No. 3,064,768, dated Nov. 20, 1962, Ser. No. 859,172, Dec. 14, 1959. Application for reissue Aug. 12, 1963, Ser. No. 303,717
14 Claims. (Cl. 188—152)

Matter enclosed in heavy brackets [ ] appears in the original patent but forms no part of this reissue specification; matter printed in italics indicates the additions made by reissue.

This invention pertains to hydraulic brakes and more particularly to hydraulic brake pressure application and lining retraction devices.

A principal object of this invention is to provide a hydraulic brake with a hydraulic retraction device that operates to maintain a minimum running clearance between the lining and the relatively moving braking surfaces between successive applications of the brake. This is accomplished in this invention by the provision of a primary piston having a frictional connection with a secondary piston and movable in one direction relative to the secondary piston to compensate for wear and in the opposite relative direction to compensate for the deflection and change of dimensions of the brake components under heat and stress.

A further object of this invention is to provide a hydraulic brake retraction mechanism in combination with a brake cylinder including a secondary hydraulic piston arranged to move within a primary piston.

A still further object of this invention is to provide a brake mechanism as outlined above including a friction drag seat positioned between cooperative portions of a primary and secondary piston providing for relative axial movement of the piston in two directions. The amount of force necessary to overcome the friction in the drag seat may be controlled for either direction and an adjustable drag seat is shown in one embodiment of the invention.

A still further object of the invention is to provide a brake mechanism as outlined above having a primary piston for the application of braking force and a secondary piston for the maintenance of a minimum running clearance arranged with a pressure reaction member so that the total effective area of the primary piston is available to effect the application of braking force.

Other objects and advantages of the invention will be apparent from the following description, the accompanying drawings and the appended claims.

In the drawings—

Figure 1:
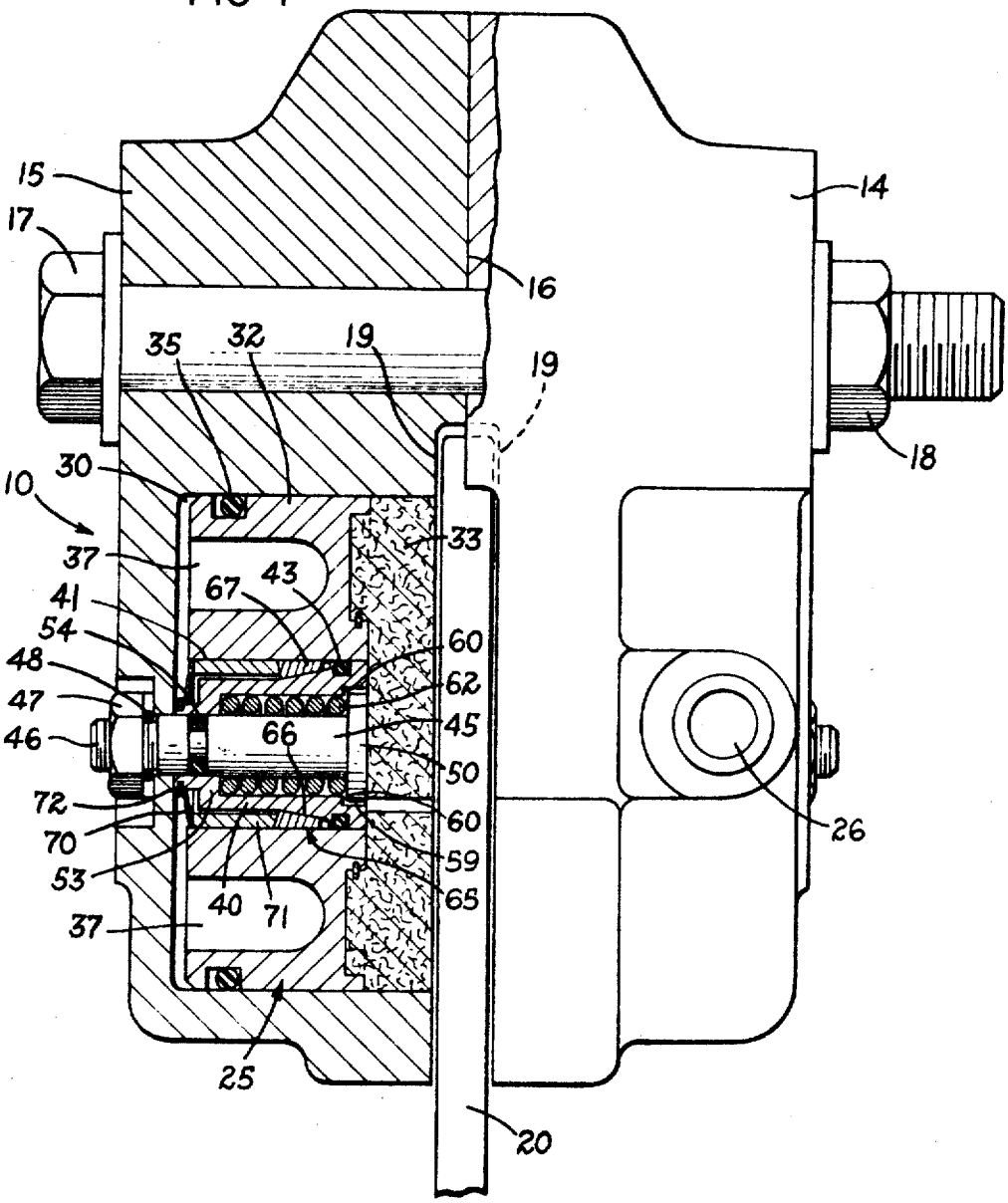
FIG. 1 is a view partially in section of one of the brake actuating mechanisms of this invention showing its application to a disk brake.

Referring to the drawings, which illustrate preferred embodiments of the invention, a disk brake is shown in FIG. 1 as including a relatively fixed body member 10. The body member 10 is divided into a right-hand body section 14 and a left-hand body section 15 which are held in abutting relation along adjoining faces 16 by a bolt 17 and a nut 18. The body sections 14 and 15 have cooperative relieved portions 19 forming a gap through which a brake disk 20 rotates.

Brake operating means by which a retarding force is aplied to the disk 20 includes a pair of brake actuating mechanisms 25, one each positioned in each of the body sections 14 and 15. The mechanisms 25 are operable upon the simultaneous application of hydraulic fluid pressure thereto through fluid inlets 26 (one shown) to effect the frictional application of braking material to opposite sides of the disk 20. It is understood that, if desired, the disk 20 may be made axially movable on its shaft and only one mechanism 25 employed in one of the sections 14 and 15, the other section merely holding a fixed pad of friction material for reactive coaction with the adjacent face of the disk upon the application of hydraulic pressure to the single mechanism 25.

The mechanism 25 is arranged to lie within a generally cylindrical cavity, one each formed in each of the body portions 14 and 15 forming a cylinder 30 for a primary force applying piston 32. The piston 32 carries a pad 33 of friction material on one face adjacent the disk 20 and is movable in the portion 15 to move the pad 33 into frictional engagement with the disk 20 upon the application of hydraulic pressure to the other side of the piston 32. The hydraulic pressure is applied behind the piston 32 through the inlet opening 26 and is prevented from escape by an O-ring seal 35 between the primary piston 32 and the wall of the cylinder 30. The primary piston 32 may be drilled or recessed as indicated at 37 to reduce weight.

Enclosed secondary piston means associated with the primary piston is provided to maintain a minimum running clearance between the pad 33 and the adjacent face of the disk 20 at all times when the hydraulic pressure is released. This consists of a generally cup-shaped secondary piston 40 relatively movably positioned within a cylindrical cavity 41 axially formed within the primary piston 32. The secondary piston 40 has a smaller effective area subject to the hydraulic pressure as compared to the primary piston 32 and is in sealing relation with the cavity 41 of the primary piston 32 by means of an O-ring 43.

The secondary piston 40 is movable between inner and outer limit positions with respect to the body portion 15. These limit positions are defined in this embodiment by a bolt 45 having an outer threaded end 46 extending through to the outside of the portion 15 and secured by a nut 47 and sealed to the body portion 15 by an O-ring 48. A head or shoulder 50 is formed on the inner end of the bolt 45 adjacent the pad 33 but makes no connection with the pad. The piston [cylinder] 40 engages the shank of the bolt 45 at an angular shoulder portion 53. The piston 40 and the bolt 45 are sealed at the portion 43 to prevent the escape of hydraulic fluid therepast into the lining by an O-ring 54. A relieved portion 59 of the secondary piston 40 cooperates with the head 50 to form a retraction gap therebeteween indicated generally at 60. A retraction spring 62 is interposed in compression between the head 50 and the shoulder portion 53 of the piston 40 to urge the secondary and primary pistons as a unit into the inner limit position shown. The gap 60 defines the extent of movement of the piston 40 between the inner and outer limit positions, and establishes the clearance between the pad 33 and the adjacent face of the disk 20.

A drag seat indicated generally at 65 comprises frictional gripping means interposed between the primary and the secondary pistons. The drag seat 65 includes an annular ramp 66 on the outer surface of the secondary piston 40. A ring 67 which may be split or formed of suitable expandible material is interposed between the primary and the secondary pistons and is formed with an inner inclined surface for cooperative engagement with the ramp 66. The ring 67 is urged onto the ramp 66 in wedging relation between the inner and outer pistons by a Belleville spring or washer 70 operating through an [on] intermediate sliding tubular sleeve 71 positioned over the cylinder 40. A snap ring 72 on the portion 53 holds the washer 70 in compression. The drag between the primary and secondary pistons thus effected may be regulated by controlling the compression of the washer 70 and the slope of the ramp 66. This drag may not, nor need not, be the same in each direction of relative movement. However, for relative movement upon the application of the brakes carrying the primary piston to the right and tending to ride the ring 67 up the ramp 66, the applied drag should be considerably less than the available force of the primary piston 32. The drag or resistance to relative movement of the secondary piston 40 to the right through the drag seat 65 should be less than the available force applicable to the secondary piston by the hydraulic pressure. As an example, the drag seat may require a pull of 200 lbs. to effect the relative movement by the primary piston and may exert a drag of 50 lbs. in the opposite direction.

In the operation of this embodiment, a moderate braking situation will first be described. Hydraulic pressure is applied through the inlet 26 to move the primary piston 32 from its retracted inner position shown first to take up the retraction clearance or gap 60 by carrying the secondary piston 40 with it to the right against the resistance of the retraction spring 62. If further braking is needed, an increase in hydraulic pressure effects the continued movement of the primary piston 32 with concomitant compression of the pad 33 against the disk 20 together with relative movement between the primary and secondary pistons through the drag seat 65. That is, the secondary piston 40 will be held against the head 50 while the primary piston 32 continues to move to apply braking force as necessary. When the hydraulic pressure is released, the gap 60 clearance is again established by the movement of the primary and secondary pistons together as a unit under the influence of the retraction spring 62. Any pad or lining wear which has occurred has been compensated for by the repositioning of the primary piston 32 on the secondary piston 40 through the drag seat 65.

In the case of heavier braking applications, the primary piston 32 will be carried on the drag seat 65 to an extent which exceeds the ability of the retraction spring 62 working through the fixed gap 60 to relieve the pressure on the lining and to reestablish a running clearance between the lining and the disk. Under severe braking applications, the body sections 14 and 15 are under considerable stress due to the hydraulic pressure and will be deformed or deflected so as to move outwardly away from each other and from the disk 20. This deformation is elastic, and the sections 14 and 15 will assume their normal positions upon the release of the pressure. However, this deflection has effected relative movement of the primary piston 32 on the secondary piston 40 to absorb this deformation in order to maintain the pad pressure on the disk, and this movement may be considered as an over-travel which must be corrected by a reverse movement of the primary piston 32 on the drag seat upon the release of hydraulic pressure. Also, the lining pad and brake components themselves will expand with heat, and this expansion requires a further change in relation between the pistons upon the release of pressure to reestablish running clearance.

The secondary piston provides the means by which a normal running clearance is maintained between each application of the brakes. In particular, the secondary piston has an effective area so correlated with the force of the drag seat so as to effect a reverse movement relative to the primary piston to reestablish the lost running clearance caused by the elastic deformation of the body under stress, the expansion of the lining pad 33, or by any other cause. Upon the release of the brakes, the hydraulic pressure does not immediately fall to zero but decays over a finite time period. This pressure, operating upon the effective area of the secondary piston 40, is sufficient to hold this piston against the resistance of the spring 62 and the drag seat 60 in abutment with the head 50 while the primary piston 32 moves to the left within the cylinder 30. This movement may be due, in part, to the return of the body portions 14 and 15 to their normal position, as described. Therefore, although the hydraulic pressure has decreased sufficiently to provide for the return movement of the portion 15 relative to the primary piston 32, it is momentarily sufficient during at least a part of this time to maintain the secondary piston against the head 50, reserving the operation of the retraction spring 62 operating through the gap 60 until such time as this gap is sufficient to provide for a running clearance between the pad 33 and the disk 20.

Figure 2:
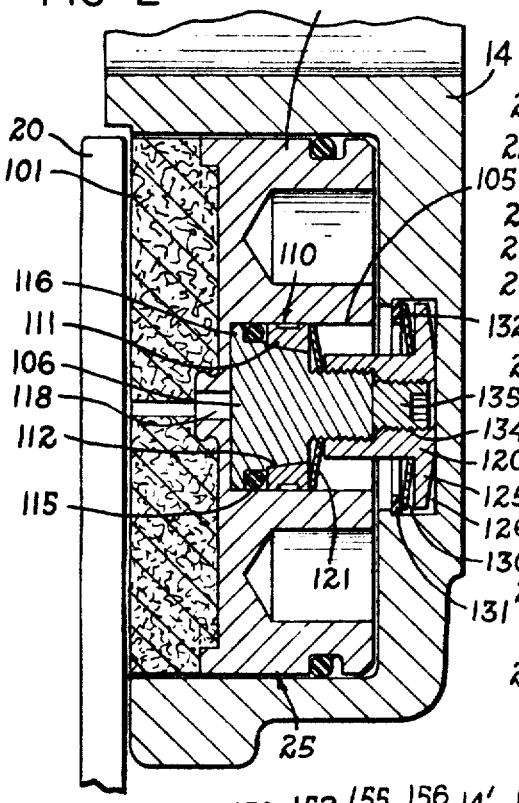
FIG. 2 is a sectional view of another embodiment of the invention.

The embodiment of the mechanism 25 of FIG. 2 is similar in function and operation to the embodiment of FIG. 1, described above, except that it is shown as being installed in the body section 14. A primary piston indicated generally at 100 is axially movable in the section 14 to apply a pad 101 of friction material to the disk 20 upon the application of hydraulic pressure thereto through the inlet 26 (FIG. 1). The primary piston 100 has an axially disposed bore 105 formed therein which receives a secondary piston 106.

Frictional gripping means interposed between the primary and secondary pistons includes a drag seat indicated generally at 110. The drag seat includes an elastic ring 111 mounted upon an annular inclined ramp 112 formed on the secondary piston 106 for frictional engagement with the surface of the bore 105, in the manner of the drag seat 65 of FIG. 1. An O-ring seal 115 positioned between the ring 111 and an annular retaining lip 116 on the piston 106 prevents the escape of hydraulic fluid into the brake lining pad 101. An opening 118 in the primary piston 100 between the secondary piston 106 and the pad 101 prevents the accumulation of pressure behind the piston 106 which would tend to obstruct its operation.

A cap bolt 120 is threaded in axial alignment on the secondary piston 106. A Belleville spring 121 is interposed in compression between the cap bolt 120 and the ring 111 to urge the ring onto the ramp 112 to effect the described frictional engagement with the bore 105. Means for adjusting the drag force which the spring 121 exerts upon the ring 111 includes the cap bolt 120 which may be adjusted by changing its threaded position upon the piston 106.

The secondary piston 106 is arranged for limited axial movement on the body section 14 between inner and outer limit positions by means of a head 125 on the bolt 120 received within an annular recess 126 formed within the section 14. The head 125 is held for limited axial movement with the piston 106 through a retraction gap indicated generally at 130 by a snap ring 131. A Belleville washer 132 is interposed between the snap ring 131 and the head 125 to constitute a brake retraction spring for urging the piston 106 into the inner limit position, shown.

The bolt 120 and head 125 are centrally tapped at 134 to accept a set screw 135. After the desired threaded position of the bolt 120 on the piston 106 has been established, setting up through the spring 121 desired resistance to relative movement of the drag seat 110, the set screw 135 may be tightened against the end of the piston 106 to lock the bolt 120 against rotation, to secure the adjustment.

The operation of the embodiment of FIG. 2 is substantially as described in connection with FIG. 1. The primary piston 100 is effective to apply the pad 101 under pressure against the adjacent side of the disk 20 upon the application of hydraulic fluid pressure thereto. The initial movement of piston 100 carries the secondary piston 106 with it through the drag seat 110 to take up the retraction gap 130 by compressing the retraction spring 132. Thereafter, additional movement of the primary piston 100 is effected through additional application of hydraulic pressure and results in relative movement between the two pistons. As noted in connection with FIG. 1, this relative movement is effective to compensate for the wear of the pad 101. However, the relative movement for a given braking application may be greater than necessary to compensate for such wear, such as where the movement has compensated for the deflection of the body sections 14 and 15. In such cases, the secondary piston 106 is effective during the release of the braking fluid pressure to maintain the head 125 in the outer limit position while the primary piston returns to the right through the drag seat 110. Upon the further decay or decrease in hydraulic pressure, the secondary piston 106 will no longer maintain the compression of the retraction spring 132 to take up the gap 130, and the spring 132 will be effective to withdraw both pistons as a unit to reestablish normal running clearance between the disk 20 and the pad 101.

Figure 4:
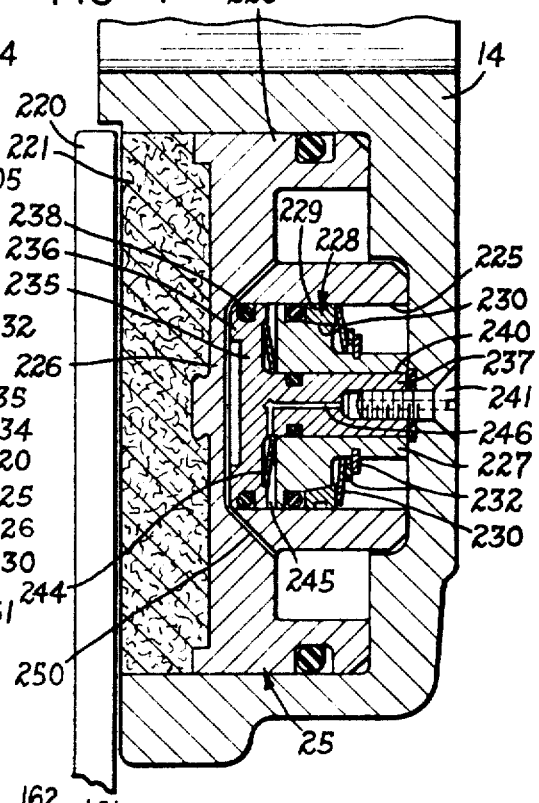
FIG. 4 is a sectional view of a modified form of the invention of FIG. 3.
Figure 3:
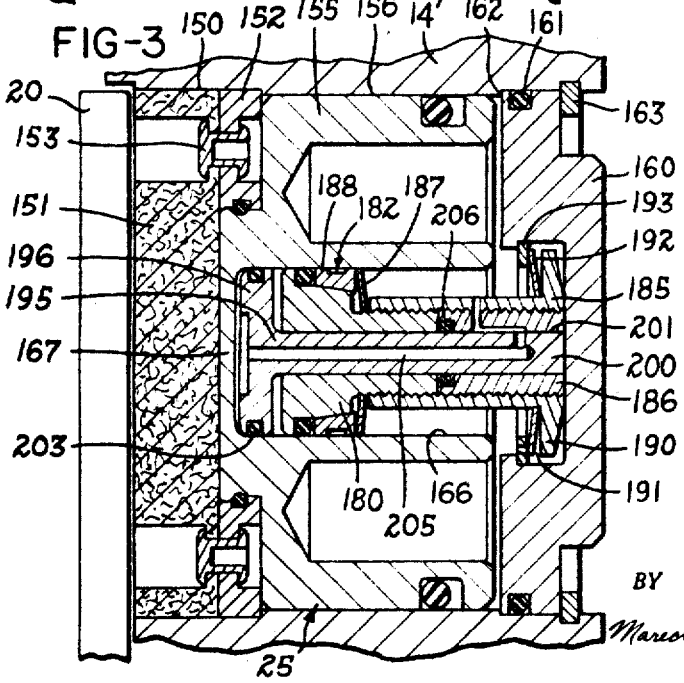
FIG. 3 is another sectional view of a further embodiment showing an arrangement for utilizing the total effective primary piston area.

In each of the embodiments of FIGS. 1 and 2 described above, the effective area of each of the secondary pistons is subtracted from the area which the primary piston would otherwise have. This may result in an undesirable decrease in braking efficiency, and may otherwise require an increase in the area of the primary piston to compensate for the area occupied by the secondary piston. In the embodiments of FIGS. 3 and 4, an arrangement is shown whereby the secondary piston is hydraulically isolated from the primary piston for the purpose of providing for complete utilization of the area of the primary piston. At the same time, the secondary piston is arranged to operate from the same source of hydraulic pressure in the manner described in connection with FIGS. 1 and 2.

Referring first to FIG. 3, a modified form of the right-hand body section is indicated at 14'. The section 14' is formed with an enlarged cylindrical opening 150 having an axis normal to the disk 20 within which an assembled friction pad 151 and retainer ring 152 are axially movable against the disk 20. Rivets 153 secure the pad 151 to the ring 152. The lining retainer ring 152 is carried on the front face of a primary piston 155. The primary piston 155 is axially movable within a cylinder 156 formed coaxially with the opening 150 but of slightly reduced radial dimension. The opposite end of the cylinder 156 is closed by a cylindrical end cap 160. The cap 160 is sealed to the section 14' to prevent the escape of hydraulic fluid by an O-ring 161 and is held in place against a shoulder 162 by a snap ring 163. As in the case of the previous embodiments described, the primary piston 155 is effective upon the application of hydraulic pressure thereto, to move the pad 151 into frictional engagement with the desk 20.

The primary piston is provided with a concentric axial bore 166 similar to the bore 105 of FIG. 2. However, the bore 166 is terminated adjacent the front of the piston 155 by an impervious end wall 167. A secondary piston 180, similar in physical appearance and function to the piston 106 of FIG. 2, is received within the bore 166 for relative movement with the primary piston through a drag seat 182. A cap bolt 185 is threaded on an extended end 186 of the piston 180. The threaded position of the cap bolt 185 may be adjusted to determine the compression of a Belleville washer 187 against an elastic or split ring 188 comprising the drag seat 182.

The secondary piston is connected to, and is arranged for limited axial movement with respect to the cap 160 by means of a head 190 arranged for movement between inner and outer limit positions within a recess 191 formed within the cap 160. A retraction spring 192 is held in compression against the head 190 by a snap ring 193 to urge the head and the pistons 155 and 180 in the inner limit position, shown.

Means for hydraulically isolating the secondary piston 180 from the primary piston 155 to expose the total effective primary piston area to hydraulic pressure includes a fixed wall member 195 having an enlarged head 196 adjacent the wall 195, and a stem 200. The stem 200 has a loose sliding fit within a bore 201 formed axially through the secondary piston 180. The stem 200 terminates in abutment against the inside surface of the cap 160 so that the member 195 is held against axial movement and is, in effect, a reaction member for the central portion of the primary piston represented by the wall 167. The head 196 is sealed at the bore 166 of the primary piston 155 by an O-ring 203. The hydraulic fluid under pressure is transmitted by the member 195 for coaction with the wall 167 through a passageway 205 in the member 195 opening at one end adjacent the wall 167 and being opened at the other end to receive hydraulic fluid under pressure through the sliding fit between the stem 200 and the bore 201. An O-ring seal 206 positioned between the secondary piston 180 and the stem 200 prevents the leakage of hydraulic fluid into the region ahead of the secondary piston which would otherwise tend to obstruct its movement.

The operation of the embodiment of FIG. 3 is substantially as described in connection with FIGS. 1 and 2. It will be understood that the movement of the secondary piston between the inner and outer limit positions will be a sliding movement on the stem 200. The provision of the reaction member 195 provides for the distribution of the hydraulic fluid pressure over the total effective area of the primary piston 155 and, at the same time, provides for the isolated operation of the secondary piston 180 within the mechanism 25.

The embodiment of the mechanism 25 of FIG. 4 shows a different arrangement of a reaction member for isolating the primary and secondary cylinders for the purpose described in connection with FIG. 3. A primary piston indicated generally at 220 is axially movable in the body section 14 to apply a pad 221 of friction material to the adjacent side of the disk 20 upon the application of hydraulic pressure thereto. The primary piston 220 includes an axially disposed bore 225 which is terminated in an enclosing wall 226 adjacent the lining pad 221. A secondary piston 227, similar in physical appearance and fuction to the piston 180 of FIG. 3, is received within the bore 225 for relative movement with the primary piston 220 through a drag seat 228. The drag seat 228 includes a split ring 229 arranged upon an annular ramp 230 and biased into contact with the bore 225 by a Belleville spring 230 held in place by washers 232 on the secondary piston 227.

Means for hydraulically isolating the secondary piston 227 from the primary piston 220 includes a fixed wall member 235 having an enlarged bore engaging head 236 and a rearwardly extending stem 237. The head 236 is sealed with the bore by means of an O-ring 238. The stem 237 extends through an axial opening 240 formed through the secondary piston 227 and is secured to the body portion 14 by a screw 241.

The secondary piston 227 is arranged for limited sliding movement on the stem 237 between inner and outer limit positions. A retraction spring, consisting of a Belleville washer indicated at 244, is interposed between the secondary piston 227 and the head 236 of the member 235 to bias the primary and secondary pistons as a unit into the inner limit position, shown. A retraction gap 245 is thus formed between the primary piston 227 and the member 235. An air vent passageway 246 formed within the member 236 provides pressure relief in assembly for the operating space of the gap 245 between the member 235 and the secondary piston 227.

Hydraulic fluid under pressure is admitted between the wall 226 and the head 236 of the member 235 for coaction with the inner surface of the wall 226 by means of passageways 250 drilled through the primary piston 220 and opening adjacent the wall 226.

The operation of the embodiment of the mechanism 25 of FIG. 4 is substantially the same as that described above in connection with FIGS. 2 and 3. It will be seen that the reaction member 235 isolates the secondary piston 227 and provides for the application of hydraulic fluid pressure to the total effective area of the primary piston 220. Since the member 235 is fixed to the body section 14, it provides the means by which the retraction spring 244 biases the pistons to the inner limit position and provides the gap 228 through which the secondary piston moves in relation to the body.

It is therefore seen that this invention provides a hydraulic brake with a brake actuating and retraction mechanism which is enclosed and sealed within the body of the brake. The mechanisms of this invention compensate for wear of the lining and include secondary pistons which adjust the relative positions of the primary and secondary pistons to compensate for the deflection of the body or housing, the expansion or wear of the lining, etc. The mechanisms of this invention always assure that a fixed minimum clearance exists between the lining and the braking surface of a moving member each time the brakes are released while providing for the most efficient utilization of the area of the primary piston.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A hydraulic brake comprising a fixed body, a relatively moving brake member adjacent said body, a primary piston in said body arranged to apply a braking force to said member upon the application of hydraulic fluid pressure thereto having means defining an aperture, a secondary piston in said aperture subject to said pressure received within said primary piston in direct sealing relation therewith at said aperture for relative frictional movement with respect to said primary piston, an incline formed on said secondary piston and a ring having an inner surface proportioned for wedging engagement on said incline for movement with said secondary piston and an outer surface in direct frictional engagement with said primary piston at said aperture means connecting said secondary piston to said body for limited movement with said primary piston between an inner position establishing a running clearance with said brake member and an outer braking position, means biasing said pistons to said inner position, said secondary piston having an effective area exposed to said hydraulic pressure correlated with the friction between said primary and secondary pistons so as to maintain said secondary piston in said outer position during a portion of the release of said hydraulic pressure from said primary piston providing for relative movement of said pistons.

2. A hydraulic brake comprising a fixed body, a relatively moving brake member adjacent said body, a primary piston in said body arranged to apply a braking force to said member upon the application of hydraulic fluid pressure thereto, means in said primary piston defining an axial bore of substantially constant diameter throughout its length, a secondary piston having an elastomeric ring thereon and subject to said pressure, said second piston arranged for frictional movement relative to said primary piston within said bore with said ring in sealing relation thereto, means connecting said secondary piston to said body for limited movement with said primary piston between an inner position establishing a running clearance with said brake member and an outer braking position, means biasing said pistons to said inner position, said secondary piston having an effective area exposed to said hydraulic pressure correlated with the friction force between said primary and secondary pistons so as to maintain said secondary piston in said outer position against said biasing means during a portion of the release of said hydraulic pressure from said primary piston providing for relative movement of said pistons.

3. A hydraulic brake comprising a fixed body, a relatively moving brake member adjacent said body, a primary piston in said body arranged to apply a braking force to said member upon the application of hydraulic fluid pressure thereto, a secondary piston subject to said pressure and including an inclined annular ramp formed thereon, a ring mounted on said ramp, means in said primary piston forming an opening receiving said secondary piston with said ring in frictional engagement therewith, means on said secondary piston forming a fluid seal with said primary piston at said opening, means connecting said secondary piston to said body for limited movement with said primary piston between an inner position establishing a running clearance with said brake member and an outer braking position, means biasing said pistons to said inner position, said secondary piston having an effective area exposed to said hydraulic pressure correlated with the friction force between said primary and secondary pistons so as to maintain said secondary piston in said outer position during at least a portion of the release of said hydraulic pressure from said primary piston providing for relative movement of said pistons.

4. A hydraulic brake comprising a fixed body, a relatively moving brake member adjacent said body, a primary piston in said body arranged to apply a braking force to said member upon the application of hydraulic fluid pressure thereto, a secondary piston subject to said pressure and having an inclined annular ramp formed thereon, an elastic ring mounted on said ramp, means in said primary piston forming an opening receiving said secondary piston with said ring in frictional engagement therewith, means on said secondary piston forming a fluid seal with said primary piston at said opening, adjustable means biasing said ring onto said ramp for varying the drag of said frictional engagement, means connecting said secondary piston to said body for limited movement with said primary piston between an inner position establishing a running clearance with said brake member and an outer braking position, means biasing said pistons to said inner position, said secondary piston having an effective area exposed to said hydraulic pressure correlated with said drag so as to maintain said secondary piston in said outer position during at least a portion of the release of said hydraulic pressure from said primary piston providing for relative movement of said pistons.

5. A hydraulic brake comprising a fixed body, a relatively moving brake member adjacent said body, a primary piston in said body arranged to apply a braking force to said member upon the application of hydraulic fluid pressure thereto, said primary piston having means defining an axial bore with a forward closed wall, a secondary piston in said bore subject to said pressure and arranged for relative frictional movement with respect to said primary piston, means forming a fluid seal between said primary piston bore and said secondary piston, means connecting said secondary piston to said body for limited movement with said primary piston between an inner position establishing a running clearance with said brake member and an outer braking position, said secondary piston having an effective area exposed to said hydraulic pressure correlated with the friction between said primary and secondary pistons so as to maintain said secondary piston in said outer position during at least a portion of the release of said hydraulic pressure from said primary piston providing for relative movement of said pistons, a reaction member fixed with respect to said body and interposed in said bore between said secondary piston and said wall, and means for applying said hydraulic fluid pressure to said primary cylinder between said reaction member and said wall so that the total effective area of said primary piston is utilized.

6. The brake of claim 5 comprising a stem on said reaction member extending rearwardly through said secondary piston for supporting said member relative to said body, said secondary piston being slidably mounted on said stem.

7. A hydraulic brake comprising a body, a relatively rotatable member having at least a portion thereof adjacent said body, a pad of friction material interposed between said member and said body and movable into frictional engagement with said member, a hydraulic actuator in said body having a primary piston positioned adjacent said pad to move said pad into frictional engagement with said member upon the application of hydraulic fluid pressure to one side of said primary piston, a secondary piston received in said primary piston in direct sealing relation therewith and connected to said body for limited movement thereto and for relative movement with respect to said primary piston, a drag seat interposed between said primary and secondary pistons, said drag seat including an inclined ramp on said secondary piston and a split ring mounted on said ramp for coaction with said primary piston, retraction means between said secondary piston and said body urging said pistons to effect withdrawal of said pad away from said member to a position of normal running clearance between said pad and said member, said primary piston being movable upon the application of fluid pressure first to move said pad into engagement with said member and further to effect relative movement of said pistons through said drag seat to establish and maintain contact of said friction material on said member irrespective of pad wear and deflection of said body under stress, said secondary piston having a sufficient area exposed to hydraulic pressure for movement relative to said primary piston through said drag seat under the influence of said pressure during the release of said brake to take up any excess travel of said primary piston relative to said secondary piston effected during the application of said brake as necessary to provide for the return of the primary piston to reestablish said running clearance under the influence of said retraction means.

*8. An automatic adjusting device for a brake comprising a housing having a cylinder therein with one end of said cylinder being open, a fluid operated piston disposed in said cylinder for movement through the open end of said cylinder, said piston being closed across its diameter adjacent said open end, a cylindrical axially extending recess in said piston opening into said cylinder and disposed opposite the closed end of the piston, an axially extending pin fixed at one end to said housing and having its other end extending into said axial recess, friction means completely enclosed within said axial recess and encircling said pin and in frictional engagement with the circumference of said axial recess, said friction means being movable axially relative to said pin and piston, and biasing means mounted on said pin and completely enclosed within said axial recess for normally urging said friction means in an axial direction away from the open end of said cylinder.*

*9. The device of claim 8 wherein said biasing means is a dished disk type spring washer.*

*10. The device of claim 8 wherein said friction means is a split sleeve.*

*11. The device of claim 8 wherein said pin has axially spaced stop means thereon and said friction means is disposed for limited axial movement between said stop means.*

*12. The device of claim 8 wherein said pin has an enlarged end thereon adjacent the end thereof within said recess which provides a stop to limit axial movement of said friction means.*

*13. An automatic adjusting device comprising a housing having a cylinder therein with one end of said cylinder being open, a fluid operated piston disposed in said cylinder for movement through the open end of said cylinder, said piston being closed across its diameter adjacent said open end, an axially extending recess in said piston opening into said cylinder and disposed opposite the closed end of the piston, an axially extending elongated member fixed at one end to said housing and having its other end extending into said axial recess, friction means completely enclosed within said axial recess and encircling said elongated member and in frictional engagement with the wall of said axial recess, said friction means being movable axially relative to said elongated member and piston, and resilient means reacting on said elongated member for normally urging said friction means in an axial direction away from the open end of said cylinder.*

*14. The device of claim 13 wherein said resilient means is located within said recess and is compressed between said other end of said elongated member and said friction means.*

References Cited by the Examiner

The following references, cited by the Examiner, are of record in the patented file of this patent or the original patent.

UNITED STATES PATENTS

| | | |
|---|---|---|
| 2,801,712 | 8/1957 | Lockhart. |
| 2,905,277 | 9/1959 | Cagle. |
| 2,996,886 | 8/1961 | Jeffries. |
| 3,032,144 | 5/1962 | Stanton. |

FOREIGN PATENTS

| | | |
|---|---|---|
| 804,826 | 11/1958 | Great Britain. |

DUANE A. REGER, *Primary Examiner.*